United States Patent
Geyler

[15] 3,703,027
[45] Nov. 21, 1972

[54] TURRET INDEXING ASSEMBLY

[72] Inventor: Arthur H. Geyler, Cincinnati, Ohio
[73] Assignee: The G. A. Gray Company, Cincinnati, Ohio
[22] Filed: April 1, 1971
[21] Appl. No.: 130,301

[52] U.S. Cl. ............... 29/39, 29/48.5, 74/813 L, 74/820, 74/826, 408/35
[51] Int. Cl. ............... B23b 29/32, B23b 3/20
[58] Field of Search .... 74/820, 813 L, 822, 823, 826; 29/35.5, 39, 48.5; 408/35

[56] References Cited

UNITED STATES PATENTS 2,898,781  8/1959  Hake ........................ 74/820

OTHER PUBLICATIONS

IBM Technical Disclosure Bulletin, Vol. 10, No. 8, January 1968, page 1217.

*Primary Examiner*—Francis S. Husar
*Attorney*—Yount and Tarolli

[57] ABSTRACT

An improved machine tool includes a rotatable turret which is indexed to move a selected one of a plurality of tools into a working relationship with a workpiece which is held by a rotatable table or spindle. A releasable coupling holds the turret against rotation relative to the workpiece during machine operations. When the turret is to be indexed, the coupling is released and a pair of intermittent gears in an indexing assembly are moved into a driving relationship to effect rotation of the turret. As the turret is indexed to a new position, the intermittent gears are moved out of the driving relationship and into a positioning relationship with each other to interrupt rotation of the turret. To prevent unnecessary loading on the intermittent gears, a holding mechanism retains the turret against rotation during the initial and final portions of an indexing cycle independently of the intermittent gears. This holding mechanism includes an escapement wheel which is engaged by a roller carrier during initial and final portions of the indexing cycle to retain the turret against rotation while the coupling is being disengaged and re-engaged and the intermittent gears are being moved between the driving and positioning relationships.

11 Claims, 8 Drawing Figures

PATENTED NOV 21 1972

INVENTOR
ARTHUR H. GEYLER

BY *Yount and Tarolli*
ATTORNEYS

FIG. 2

INVENTOR
ARTHUR H. GEYLER
BY Yount and Tarolli
ATTORNEYS

INVENTOR
ARTHUR H. GEYLER
BY Yount David Tarolli
ATTORNEYS

TURRET INDEXING ASSEMBLY

This invention relates to a machine tool having an improved indexing assembly for rotating a turret to position tools in a desired relationship relative to a workpiece.

In a vertical boring machine, a workpiece is clamped to a circular table which rotates about a vertical axis. A plurality of cutting tools are carried on a multi-sided turret which is rotated about a horizontal axis by an indexing assembly to position the tools in a desired relationship with the workpiece. A known indexing assembly for rotating the turret of a boring machine is disclosed in U. S. Pat. No. 2,898,781 to W. T. Hake.

During an indexing cycle, this known turret indexing assembly releases a coupling which holds the turret against rotation while machining operations are being performed on the workpiece. After the coupling has been released, a pair of intermittent gears are moved from a turret positioning relationship into a driving relationship to rotate or index the turret. The intermittent gears are then moved back into the turret positioning relationship and the coupling is re-engaged to hold the turret during a subsequent machining operation. When the intermittent gears are in the turret positioning relationship, a smooth semi-circular positioning segment on one of the gears engages a smooth concave indexing recess or segment formed on the other intermittent gear. These positioning and indexing segments function to interrupt rotation of the turret when it has been indexed from one position to another. In addition, the positioning and indexing segments of this known indexing assembly hold the turret against undesired rotation during disengagement and re-engagement of the coupling.

The turret may often be unbalanced about its horizontal axis of rotation due to the mounting of an oversized tool on one side of the turret. During engagement and disengagement of the coupling, this unbalanced condition of the turret can result in the transmission of a relatively large torque to the intermittent gears while they are in their positioning relationship. If sufficiently great, the unbalanced torque can overstress and quickly wear the indexing and positioning segments of the intermittent gears so that excessive clearance develops between the gears. When this occurs, the intermittent gears can no longer hold the turret against undesired rotation with a resulting misalignment of the turret. In addition, a similar misalignment can be caused by the unbalanced torque as the teeth on driving segments of the intermittent gears are moved into and out of engagement.

The present invention overcomes these prior art problems by providing a mechanism which holds the turret against undesired rotation during disengagement and reengagement of the coupling. This mechanism functions independently of the intermittent gears to prevent them from being unnecessarily stressed and worn by torque resulting from an unbalanced loading of the turret. This tends to prevent misalignment of the turret during indexing operations and increases the effective operating life of the turret indexing assembly.

Accordingly, it is an object of this invention to provide a new and improved machine tool having a turret indexing assembly which includes a holding mechanism for retaining a turret against rotation during initial and final portions of an indexing cycle independently of intermittent gears which effect rotation of the turret during the indexing cycle.

Another object of this invention is to provide a new and improved machine tool in accordance with the next preceding object and wherein the holding mechanism includes a retaining assembly which is operatively connected with one of the intermittent gears and an escapement wheel which is operatively connected with the other intermittent gear, the retaining assembly and escapement wheel being movable into cooperating engagement to retain the turret against rotation during the initial and final portions of the indexing cycle.

Another object of this invention is to provide a new and improved machine tool which includes a turret for holding a plurality of tools for operating on a workpiece, a drive assembly which includes a pair of gears which are movable into and out of meshing engagement to effect rotation of the turret, and wherein a retaining member is operatively connected with one of the gears and a holding member is operatively connected with the other gear to hold the gears and the turret against rotation during movement of the gears into and out of meshing engagement with each other.

These and other objects and features of the invention will become more apparent upon a consideration of the following description taken in connection with the accompanying drawings wherein.

Although the present invention can be utilized in many different types of machine tools, it is described and illustrated herein in connection with a vertical boring machine 10. The vertical boring machine 10 includes a rotatable table or spindle 12 on which a workpiece 14 is rotated. A multi-sided turret 18 carries a plurality of tools 20 for performing various machining operations on the workpiece 14. The turret 18 is movable horizontally along a crossrail 24 which is mounted on an upright base or column 26. The turret 18 is supported on the cross-rail 24 by a saddle 30 which is movable transversely along the cross-rail 24 by operation of a suitable motor (not shown). In addition, a slide 32 is movable vertically relative to the saddle 30 to position the tool in the desired vertical relationship relative to the workpiece 14. Since the general construction and mode of operation of vertical boring machines are well known, the general operating features of the vertical boring machine 10 will not be further described herein to avoid prolixity of description.

Figures 1, 3, 7:
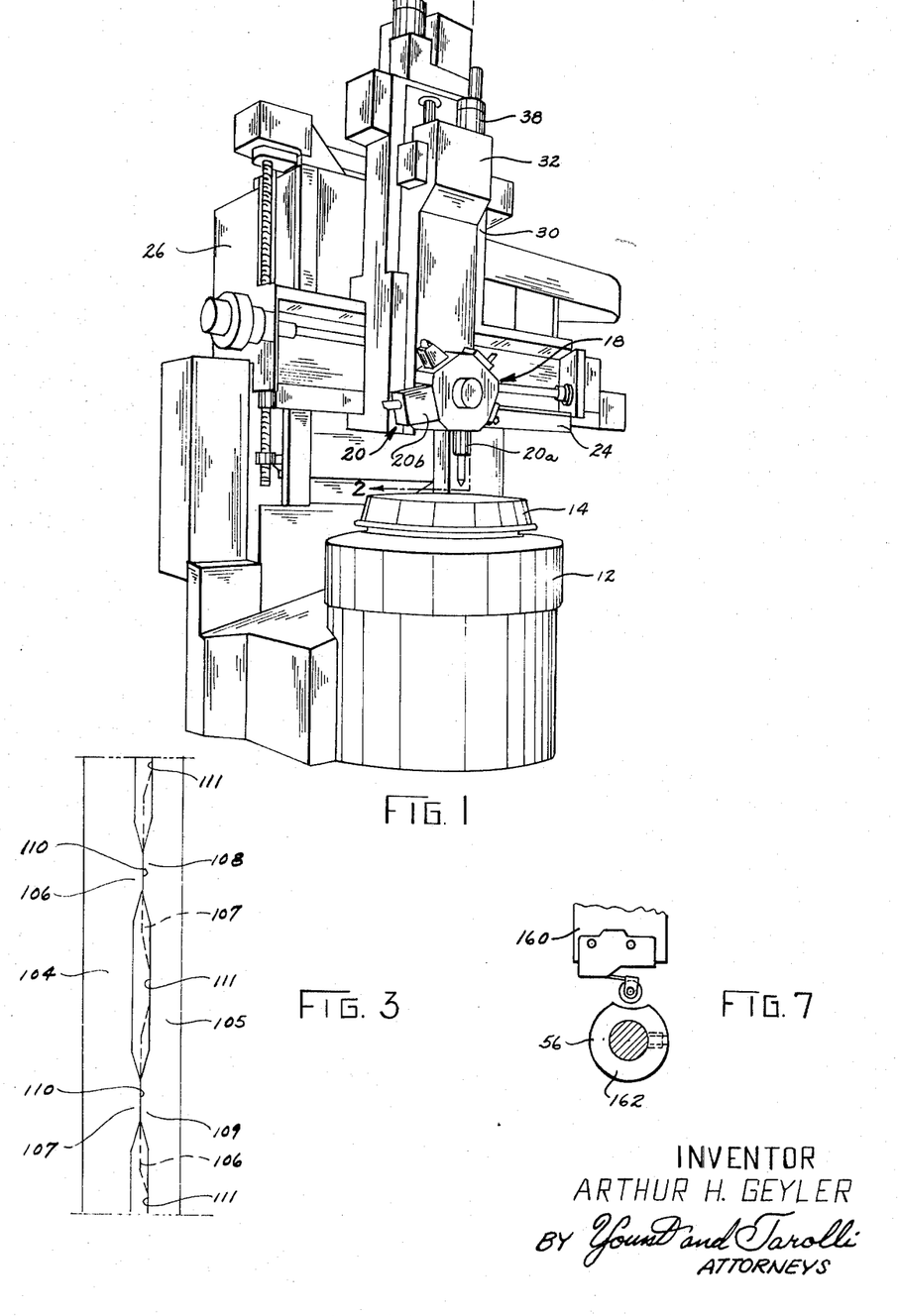
FIG. 1 is a pictorial illustration of a vertical boring machine having an improved turret indexing assembly constructed in accordance with the present invention.
FIG. 3 is a projected plan view, taken on an enlarged scale along the line 3—3 of FIG. 2, illustrating the relationship between a pair of cams in a turret coupling actuator assembly.
FIG. 7 is a plan view, taken generally along the line 7—7 of FIG. 2, illustrating a control switch for interrupting operation of the turret indexing motor at the end of a turret indexing cycle.
Figure 2:
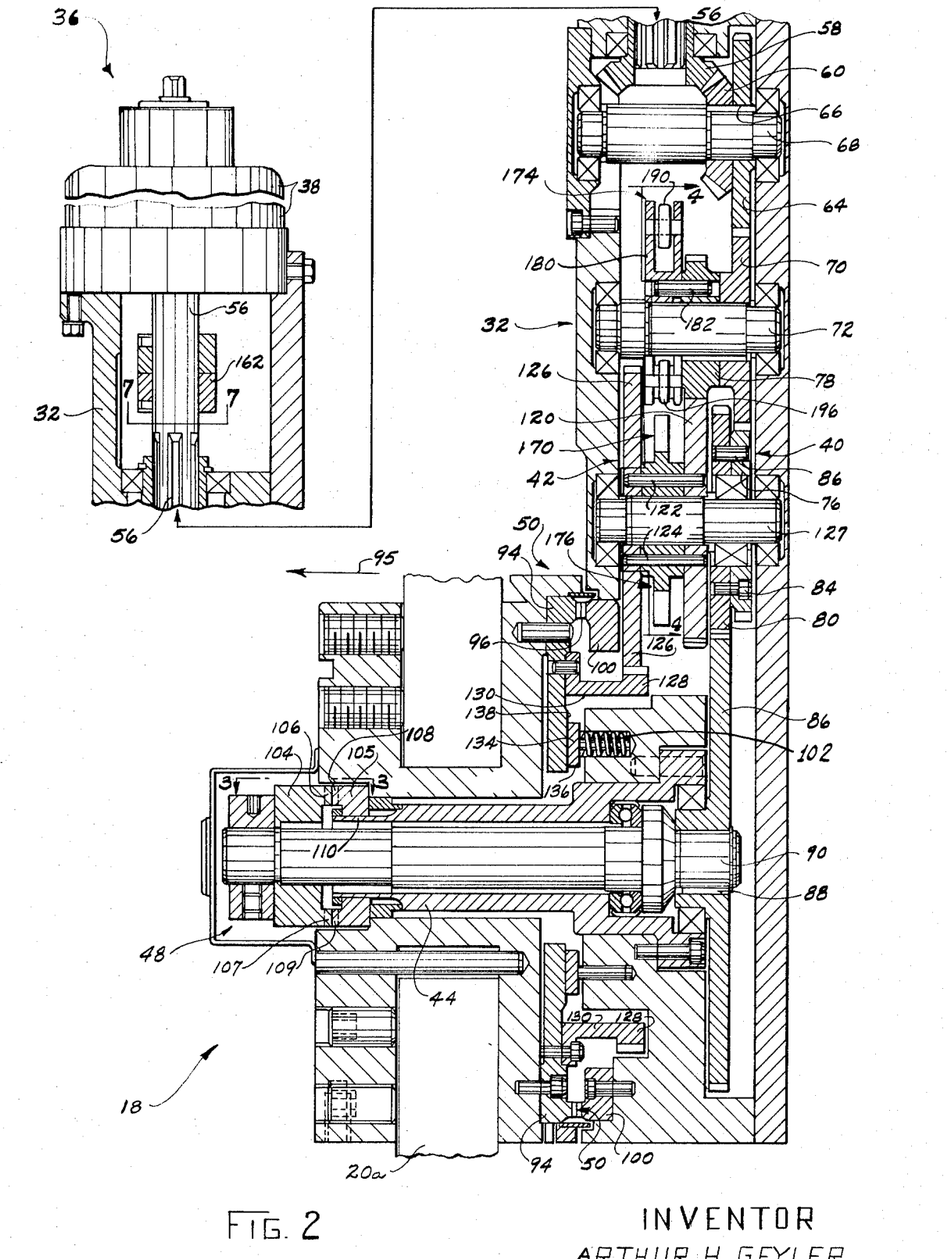
FIG. 2 is an enlarged sectional view, taken generally along the line 2—2 of FIG. 1, illustrating the improved turret indexing assembly, the upper portion of the assembly being displaced relative to the lower portion of the assembly.

An improved turret indexing assembly 36 constructed in accordance with the present invention is illustrated in FIG. 2. The turret indexing assembly is driven by a motor 38 which is mounted on the slide 32 with the turret 18. During a turret indexing operation the motor 38 continuously drives both a coupling actuator drive train 40 and a turret indexing drive train 42 to index the turret 18 about a horizontal support shaft 44. The drive train 40 operates a coupling actuator assembly 48 to release a curved radial splined coupling or "Curvic Coupling" 50 which holds the turret 18 against rotation about the support shaft 44 during machine operations on the workpiece 14. After the coupling 50 has been disengaged, the turret indexing drive train 42 rotates the turret 18 about the shaft 44 to move the tool 20a (FIG. 1) out of an operating position relative to the workpiece 14 and to move the tool 20b into the operating position. Once this has been accomplished by operation of the turret indexing drive train 42 (FIG. 2), continued operation of the coupling actuator drive train 40 operates the coupling actuator assembly 48 to re-engage the coupling 50.

The coupling actuator drive train 40 and turret drive train 42 are driven from the indexing motor 38 by way of a power shaft 56 which extends vertically along the slide 32 from the motor 38 (see FIG. 1) to a pair of mating bevel gears 58 and 60 (FIG. 2). Although the drive shaft 56 has been shown in FIG. 2 as being interrupted and offset for ease of illustration, it should be understood that the drive shaft 56 is a straight continuous shaft which extends vertically along the slide 32. Torque is transmitted to the coupling actuator drive train and turret drive train 42 by a spur gear 64 which is keyed at 66 to a rotatable support shaft 68 and bevel gear 60. The spur gear 64 is in meshing engagement with a spur gear 70 which is keyed to a support shaft 72. Rotation of the drive shaft 56 by the indexing motor 38 results in the gear 70 and support shaft 72 being rotated to drive an initial gear 76 in the coupling actuator drive train 40 and an intermittent drive gear 78 in the turret drive train 42.

During an indexing cycle, operation of the indexing motor 38 simultaneously and continuously drives both the coupling actuator drive train 40 and the turret drive train 42. However, during an initial portion of the indexing cycle the turret drive train 42 is ineffective to rotate the turret 18 until after the coupling 50 has been released by operation of the coupling drive train 40. To effect a releasing of the coupling 50 during the initial portion of an indexing cycle, rotation of the spur gear 76 in the coupling drive train 40 drives the spur gear 80 through suitable connecting pins 84. Rotation of the spur gear 80 is transmitted to the coupling drive gear 86 which is keyed at 88 to a coupling drive shaft 90. The coupling drive shaft 90 extends to the coupling actuator assembly 48 through the horizontal turret support shaft 44 in a co-axial relationship with the turret support shaft and the turret 18.

Rotation of the drive shaft 90 operates the coupling actuator assembly 48 to disengage the coupling 50. The coupling 50 is disengaged by moving an annular coupling section 94 axially outwardly, that is in the direction of the arrow 95 in FIG. 2, to disengage a plurality of teeth 96 on the coupling section 94 from a similar set of teeth on a fixed coupling section 100. On disengagement of the coupling 50 the turret 18 can be rotated about the support shaft 44 by the turret drive train 42.

The coupling actuator assembly 48 disengages the coupling 50 by releasing the turret 18 and the section 94 of the coupling for movement in an outward direction under the influence of a plurality of biasing springs 102 (only one of which is shown). The coupling actuator assembly 48 includes an outer cam element 104 which is fixedly connected to the drive shaft 90 and inner cam element 105 which is fixedly connected with the turret 18 and is slidably mounted on a splined outer end portion 110 of the turret support shaft 44. Upon rotation of the drive shaft 90 and cam element 104 relative to the cam element 105 and turret 18 during an initial portion of an indexing cycle, the inner cam element 105 is released for axially outward movement along the support shaft 44 under the influence of the pressure bias exerted by the springs 102 against the turret 18.

To provide for this axial movement of the inner cam element 105 relative to the outer cam element 104 with the resulting disengagement of the coupling 50, the outer cam element 104 has axially projecting locking sections 106 and 107 and the inner cam element 105 has axially projecting locking sections 108 and 109 (FIG. 3) which are disposed in abutting engagement when the coupling 50 is in the engaged condition of FIG. 2. Upon rotation of the outer cam element 104 by the coupling actuator drive train 40, the locking sections 106 and 107 on the outer cam element are displaced circumferentially relative to the locking sections 108 and 109 on the inner cam element 105. As the locking sections 106, 107 on the outer cam element 104 are fully displaced relative to the locking sections 108 and 109 on the inner cam element 105, the springs 102 (FIG. 2) move the turret 18 outwardly, in the direction of the arrow 95, so that locking surfaces 110 on the outer cam element 104 are disposed in abutting engagement with dwell or recess surfaces 111 on the inner cam element 105 (as shown in dashed lines in FIG. 3).

This outward movement of the inner cam element 105 and turret 18 relative to the outer cam element 104 results in the teeth 96 on the outer section 94 of the coupling 50 being moved out of engagement with the teeth on the inner section 100 to thereby release the turret 18 for rotation relative to the support shaft 44. After the coupling 50 has been disengaged, the turret 18 and inner coupling element 105 are rotated together under the influence of the turret drive train 42 during continued operation of the indexing motor 38. It should be noted that while the turret 18 and inner coupling element 105 are being rotated by the turret drive train 42, the coupling actuator drive train 40 is rotating the outer coupling element 104 in the same direction.

Once the coupling 50 has been disengaged by operation of the coupling actuator assembly 48, the turret 18 is rotated by meshing engagement of a drive segment 114 on the intermittent gear 78 (FIG. 4) with a drive segment 118 on an intermittent index gear 120. Rotation of the intermittent index gear 120 is transmitted by drive pins 122, 124 (FIG. 2) to a spur gear 126 which is rotatably mounted on a support shaft 127 in meshing engagement with a ring gear 128. The ring gear 128 is mounted on an axially projecting flange or wall 130 which is fixedly connected with the turret 18 to impart rotational movement to the turret upon rotation of the spur gear 126. During rotation of the turret 18, a pressure flange 134 slides relative to a shoe 136 which is urged against a pressure surface 138 by the spring 102.

Figure 4:
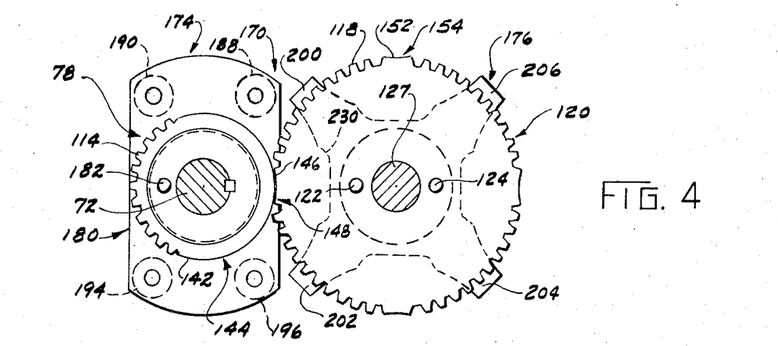
FIG. 4 is a plan view, taken generally along the line 4—4 of FIG. 2, illustrating the relationship between a pair of intermittent drive gears and a holding assembly during machining operations in which the turret is held against rotation by a coupling.
Figure 5:
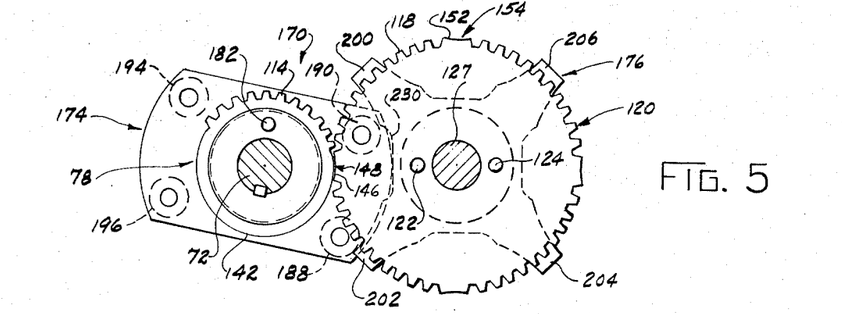
FIG. 5 is a plan view, similar to FIG. 4, illustrating the relationship between the intermittent gears and holding assembly during an initial portion of an indexing cycle during which the coupling is disengaged and the holding assembly retains the turret against rotation.

While the outer cam element 104 is being rotated relative to the inner cam element 105 to effect a disengagement of the coupling 50 by operation of the coupling actuator drive train 40, the intermittent gear 78 in the turret drive train 42 is rotated from the position shown in FIG. 4 to the position shown in FIG. 5. Since the turret 18 should not be rotated until the coupling 50 is fully disengaged, rotation of the intermittent gear 78 from the position shown in FIG. 4 to the position shown in FIG. 5 is ineffective to drive the index gear 120. This is because a smooth circular positioning surface 142 on a positioning segment 144 of the drive gear 78 slides or moves relative to a smooth concave indexing surface 146 on an indexing segment 148 of the intermittent index gear 120. During this movement, the coupling actuator assembly 48 releases the coupling 50 so that on continued operation of the indexing motor 38, the gear segment 114 meshes with and drives the gear segment 118 to rotate the turret 18. Continued rotation of the intermittent drive gear 78 rotates the index gear 120 in a counterclockwise direction from the position shown in FIG. 5 to the position shown in FIG. 6 to thereby drive the spur gear 126 and ring gear 128 (FIG. 2) to rotate the turret 18 in a counterclockwise direction as viewed in FIG. 1. This movement of the turret 18 is sufficient to index the turret one position, that is to move the tool 20a out of the working position shown in FIG. 1 and to move the tool 20b into the working position.

After the turret 18 has been indexed, rotation of the turret is interrupted by movement of the drive segment 114 on the intermittent drive gear 78 out of meshing engagement with the drive segment 118 on the index gear 120. As this occurs, indexing surface 152 on an indexing segment 154 of the index gear 120 is moved into sliding engagement with the positioning segment 142 on the drive gear 78. Thus, the positioning segment 142 on the drive gear 78 and indexing segments on the index gear 120 cooperate to insure that the turret 18 is indexed one position on each indexing operation or cycle.

Once the turret 18 has been indexed under the influence of driving forces transmitted by the intermittent gears 78 and 120, the coupling 50 is re-engaged to hold the turret 18 in the position to which it was indexed. Re-engagement of the coupling 50 is effected by continuing the rotation of the outer cam section 104. This continued rotation of the outer cam section 104 forces the inner cam section 105 axially inwardly along the support shaft 44 to thereby press the turret 18 inwardly against the influence of the biasing springs 102. As the turret 18 is pressed inwardly, the teeth 96 of the coupling 50 are moved into meshing engagement.

To effect this continued rotation of the cam section 104, the coupling actuator drive train 40 and indexing motor 38 continue their uninterrupted operation even after the turret 18 has been indexed to the desired position. During this continued operation of the coupling actuator drive train 40, the drive shaft 90 (FIG. 2) is rotated to move the locking element 107 (FIG. 3) on the outer cam section 104 from a position offset from and immediately adjacent to the locking section 108 on the inner cam section 105 to a position in which the surface 110 on the locking section 107 is disposed in abutting engagement with the locking section 108 on the inner cam section 105. In addition, the locking section 106 is moved from a position immediately adjacent and offset of the locking section 109 to a position in which the surface 110 of the locking section 106 presses against the locking section 109 on the inner cam element 105. Thus, the outer cam element 104 is rotated through half of a revolution relative to the inner cam element 105 during each indexing cycle or operation.

As the locking sections 106, 107 on the outer cam element 104 are moved back into engagement with the blocking sections 108, 109 on the inner cam element 105, the turret 18 is moved inwardly to bring the teeth 96 (FIG. 2) on the coupling section 94 into meshing engagement with the teeth on the fixed coupling section 100. As the turret 18 is moved inwardly, the pressure flange 134 presses the shoe 136 inwardly to thereby compress the springs 102. Once the coupling 50 has been re-engaged, the tool 20b can be utilized to perform machining operations on the workpiece 14.

During operation of the coupling assembly 50 from the disengaged condition to the engaged condition, the indexing motor 38 is operated to drive both the coupling actuator drive train 40 and turret indexing drive train 42. Of course, this results in rotation of the intermittent drive gear 78 in the turret indexing drive train 42. However, the turret 18 has previously been indexed to the desired position relative to the workpiece 14. Accordingly, the positioning segment 142 of the intermittent drive gear 78 merely rotates or slides relative to the indexing segment 154 on the intermittent indexing gear 120 without rotating the indexing gear as the coupling 50 is engaged. This rotation of the intermittent drive gear 78 is sufficient to move the positioning segment 142 into the same position relative to the indexing segment 154 as in which the intermittent drive gear 78 has relative to the indexing segment 148 in FIG. 4.

It should be noted that although the turret has five faces or toolholding positions, the indexing gear 120 has only four driving segments spaced four positioning segments. Therefore, the arcuate distance through which the indexing gear 120 is moved during an indexing cycle is greater than the arcuate distance through which the turret 18 is moved. To compensate for this, the drive ratio between the spur gear 126 and the ring gear 128 is such that one-quarter of a revolution of the indexing gear 120 results in the turret 18 and ring gear 128 being moved through one-fifth of a revolution.

At the completion of an indexing cycle, that is immediately after re-engagement of the coupling 50, operation of the indexing motor 38 is interrupted. This is accomplished by a suitable control circuit which includes a switch 160 (FIG. 7) which is actuated by a cam 162 on the drive shaft 56 at the end of the indexing cycle. Since the specific control circuitry does not form a part of this invention, it is believed that a further description of the circuitry is not necessary at this time. However, it should be noted that control circuitry similar to that illustrated in U.S. Pat. No. 2,979,971 to Darash could be associated with the turret indexing mechanism 36.

The tools 20 mounted on the different faces of the turret 18 have different sizes and weights. Thus, the tool 20b (see FIG. 1) is considerably larger and heavier than the tool 20a. This results in the application of an unbalanced load to the turret 18 tending to rotate the turret about the support shaft 44. When the coupling 50 is engaged, this unbalanced torque load is easily resisted by the coupling. However, when the coupling 50 is disengaged, the torque load is transmitted by the ring gear 128 to the turret indexing drive train 42.

If the torque load resulting from an unbalanced turret 18 is transmitted to the index gear 120 by the spur gear 126 (FIG. 2) as the coupling 50 is disengaged, the torque load will be resisted by engagement between the relatively smooth indexing segment 148 on the index gear 120 and the smooth positioning segment 142 on the drive gear 78 (see FIG. 5). Similarly, if the torque load resulting from an unbalanced turret 18 is transmitted to the index gear 120 during engagement of the coupling 50, the torque load must also be resisted by engagement between a smooth indexing section, such as the indexing section 154, and the smooth positioning segment 142 (see FIG. 6). This torque load causes an unnecessary loading and relatively high stresses on the indexing segment of the index gear 120 each time an indexing operation is performed. Of course, this relatively high loading will result in unnecessary wear of the indexing segments.

This unnecessary wear can result in the turret being moved slightly so that the teeth of the coupling 50 are not brought into meshing engagement with the turret 18 in the desired position relative to the workpiece. In addition, if the unbalanced torque load is transmitted to the index gear 120, an unnecessarily large loading is applied to the drive segments of the index gear 120 and drive gear 78 each time they are moved into and out of meshing engagement. This can result in excessive gear tooth wear at a location where substantial clearance is necessary in order to avoid mechanical interference between the teeth of the drive segments and the positioning and indexing segments of the gears.

The present invention provides a mechanism 170 for holding the turret 18 against undesired rotation during disengagement and re-engagement of the coupling 50. The holding mechanism 170 prevents any torque load resulting from an unbalanced turret 18 from being transmitted to the intermittent indexing gear 120 and drive gear 78 until drive segments of these gears have been moved into meshing engagement. This prevents unnecessary loading of the indexing and positioning segments of the intermittent gears 120 and 78 during an indexing operation.

The holding mechanism 170 includes a roller carrier or retainer assembly 174 which is moved into engagement with an escapement or retaining wheel 176 during disengagement and re-engagement of the coupling 50 to hold the turret 18 against rotation. Any torque loading resulting from an unbalanced turret is resisted by the holding mechanism 170 so that an excessive load is not applied to the intermittent gears 78 and 120. Once the coupling 50 has been disengaged and drive segments of the intermittent gear 78 and 120 moved into meshing engagement, the roller carrier assembly 174 is moved out of engagement with the escapement wheel 176 to enable the turret 18 to be indexed or rotated by the turret indexing drive train 42. As soon as the turret 18 has been rotated to the desired position, the roller carrier assembly 174 is moved back into engagement with the escapement wheel 176 to hold the turret against further rotation while the coupling 50 is engaged. Thus, the roller carrier 174 and escapement wheel 176 cooperate to hold the turret 18 against undesired rotation during disengagement and re-engagement of the coupling 50 independently of the intermittent gears 78 and 120 to thereby prevent the application of unnecessary wear inducing forces to these gears.

The roller carrier assembly 174 includes a carrier 180 which is mounted on the shaft 72 in a fixed relationship with the intermittent drive gear 78 by a pin 182 so that the roller carrier 170 rotates with the drive gear 78 during an indexing cycle. During operation of the coupling actuator drive train 40 to disengage the coupling 50 during the initial portion of an indexing cycle, retaining members or rollers 188, 190 are moved into engagement with the escapement wheel 176 to hold the escapement wheel and intermittent indexing gear 120 against rotation (see FIG. 5). During re-engagement of the coupling 50, a second pair or rollers or retaining members 194, 196 are moved into engagement with the escapement wheel 176 to hold the indexing gear 120 against rotation (see FIG. 6).

The escapement wheel 176 is mounted on the shafts 127 in a fixed relationship with the index gear 154 by the pins 122 and 124. The escapement wheel 176 includes a plurality of radially extending spokes or arms 200, 202, 204 and 206 which are engaged by the rollers 188, 190, 194 and 196 of the carrier assembly 174 to hold the escapement wheel against rotation relative to the shaft 208. When one or more of the rollers 188, 190, and 196 are in engagement with a spoke 200, 202, 204 or 206 of the escapement wheel 176, the carrier assembly 174 blocks rotation of the escapement wheel 176 and gear 120.

Figure 8:
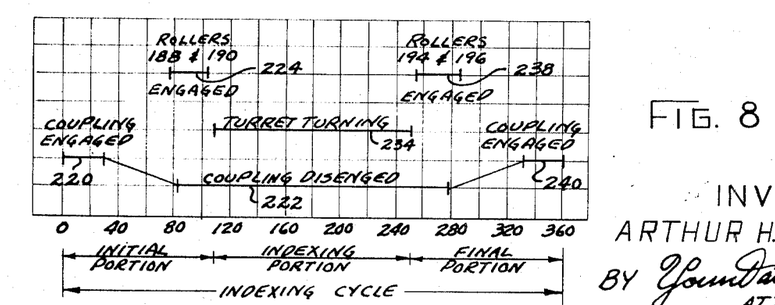
FIG. 8 is a graph depicting a turret indexing cycle.

During machining operations on the workpiece 14, the coupling 50 is engaged to hold the turret 18 against rotation and the holding mechanism 170 is in the ineffective or disengaged condition shown in FIG. 4. Upon initiation of an indexing cycle, the actuator assembly 48 effects operation of the coupling 50 from the engaged condition, indicated schematically by line 220 in FIG. 8 to the disengaged condition, indicated schematically by line 222 in FIG. 8. As the coupling 50 is being disengaged and while the teeth of the coupling are still in a meshing relationship, the rollers 188 and 190 of the carrier assembly 170 are moved into engagement with the arms 200 and 202 of the escapement wheel 176, as is indicated by the line 224 in FIG. 8. Thus, the rollers 188 and 190 engage the escapement wheel 176 as the coupling 50 is disengaged to prevent unnecessary loading of the intermittent gears 78 and 120.

Continued operation of the drive motor 38 results in the roller 188 being moved clear of the end portion of the arm 202 while the roller 190 moves into a depression or recess 230 (FIG. 5) between the arms 200 and 202 of the escapement wheel 176. As the rollers 188 and 190 move clear of the arms 202 and 200 of the escapement wheel 176, the escapement wheel is released so that the drive segment 114 on the intermittent gear 78 cooperates with the drive segment 118 on the intermittent index gear 120 to rotate the index gear in a counterclockwise direction as viewed in FIG. 5. This rotational movement of the index gear 120 results in the turret 18 being indexed through one position in the manner previously explained and as indicated schematically by line 234 in FIG. 8.

Figure 6:
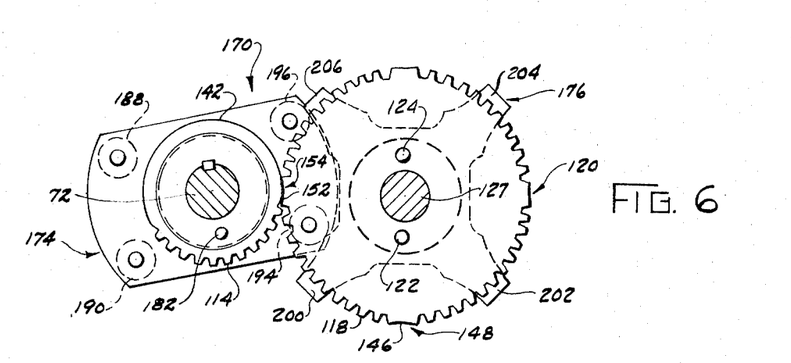
FIG. 6 is a plan view, generally similar to FIG. 5, illustrating the relationship between the intermittent gears and the holding assembly during a final portion of an indexing cycle.

During this indexing movement of the turret 18, the rollers 194 and 196 are moved from the fully disengaged position shown in FIG. 5 to the engaged position shown in FIG. 6. It should be noted that as the rollers approach the engaged position shown in FIG. 6, they do not interfere with the arms of the escapement wheel 176 since the escapement wheel is also being rotated by the meshing relationship between the drive segments 114 and 118 of the intermittent gears 78 and 120. As the drive segments 114 and 118 are moved out of meshing engagement, the roller 194 and 196 are moved into engagement with the arms 200 and 206 (as shown in FIG. 6) to hold the escapement wheel and intermittent gear 120 against rotation. This engagement of the rollers 194 and 196 of the arm 200 and 206 of the escapement wheel 176 during the final portion of the indexing cycle is indicated by the line 238 in FIG. 8. The rollers 194 and 196 remain in engagement with the arms 200 and 206 of the escapement wheel 176 as the coupling actuator assembly 48 is being operated to initiate re-engagement of the coupling 50.

Continued operation of the coupling actuator assembly 48 will result in the coupling 50 being engaged (as indicated by line 240 in FIG. 8). to hold the turret 18 against rotation. As the coupling 50 is engaged, the roller 196 is moved into and out of engagement with the arm 200 of the escapement wheel 176 and the carrier assembly 174 is moved to the position shown in FIG. 4. However, the positioning segment 142 on the drive gear 78 will now be in engagement with the indexing segment 154 rather than the indexing segment 148 as shown in FIG. 4.

In view of the foregoing description, it is apparent that the holding mechanism 170 includes a carrier assembly 174 having rollers which are moved into engagement with arms of an escapement wheel 176 to hold the turret 18 against rotation during the initial and final portions of an indexing cycle to prevent the transmission of a torque load from the turret 18 to the intermittent gears 78 and 120. In so doing, the holding mechanism 170 prevents the intermittent gears from being unnecessarily stressed and worn during disengagement and re-engagement of the coupling 50. Once the drive segment 114 on the drive gear 78 has been moved into meshing engagement with a drive segment, such as the drive segment 118 of the index gear 120, the holding mechanism 170 is rendered ineffective so that the drive gear 178 can effect rotational movement of the turret 18. Of course, when the drive segment on the intermittent gear 120 is in meshing engagement with the drive segment 114 on the drive gear 78, the torque load is distributed between a plurality of teeth on drive teeth on each of the gears so that the gears are not excessively loaded.

Having described a specific preferred embodiment of the invention, the following is claimed:

1. A machine tool comprising a base, means connected with said base for holding a workpiece, rotatable turret means for holding a plurality of tools for performing work operations on the workpiece, releasable coupling means for holding said turret means against rotation relative to said base, said coupling means being operable between an engaged condition and a released condition in which said coupling means is ineffective to hold said turret means against rotation relative to said base, and indexing means operable through an indexing cycle to effect rotation of said turret means relative to said base, said indexing means including actuator means for operating said coupling means from the engaged condition to the released condition during an initial portion of the indexing cycle, drive means including a pair of cooperating gears for rotating said turret means after operation of said coupling means to the released condition during the initial portion of the indexing cycle, said actuator means being effective to operate said coupling means from the released condition to the engaged condition during a final portion of the indexing cycle after rotation of said turret means by said drive means, and holding means for holding said turret means against rotation during the initial and final portions of the indexing cycle independently of said pair of cooperating gears.

2. A machine tool as set forth in claim 1 wherein said means for holding said turret means includes a retaining member operatively connected with one gear of said pair of cooperating gears and means operatively connected with the other gear of said pair of cooperating gear for engaging said retaining member during the initial and final portions of the indexing cycle to hold said one gear against rotational movement.

3. A machine tool as set forth in claim 2 wherein said retaining member is an escapement wheel having a plurality of arms and said means for engaging said retaining member includes locking surface means which engages at least one of said arms during the initial and final portions of the indexing cycle to retain said one gear against rotational movement.

4. A machine tool as set forth in claim 1 wherein at least one gear of said cooperating pair of gears includes a first portion which is effective to rotate the other gear of said cooperating pair of gears during rotation of said turret means by said drive means and a second portion which is ineffective to rotate the other gear of said cooperating pair of gears upon rotation of said one gear during the initial and final portions of the indexing cycle.

5. A machine tool as set forth in claim 4 wherein said holding means includes an escapement wheel connected with said other gear of said pair of cooperating and a retaining means connected with said one gear of said pair of cooperating gears, said retaining means being disposed in engagement with said escapement wheel to hold said other gear against rotational movement.

6. A machine tool comprising a base, means on said base for holding a workpiece, rotatable turret means for holding a plurality of tools, drive means for rotating said turret means, said drive means including first and second rotatable gears, said first gear being movable into and out of meshing engagement with said second gear, a retaining member operatively connected with said second gear, and holding means operatively connected with said first gear for engaging said retaining member to hold said second gear and said turret means against rotation relative to said base during movement of said first gear into and out of meshing engagement with said second gear.

7. A machine tool as set forth in claim 6 further including releasable coupling means for holding said turret means against rotation, said coupling means being operable between an engaged condition in which said turret means is held against rotation relative to said base by said coupling means and a disengaged condition in which said coupling means is ineffective to hold said turret means against rotation relative to said base, said holding means being disposed in engagement with said retaining member during operation of said coupling means between the engaged and disengaged conditions to thereby hold said turret means against rotation relative to said base during engagement and disengagement of said coupling means.

8. A machine tool as set forth in claim 6 wherein said retaining member is an escapement wheel having a plurality of outwardly extending arms, said holding means including means mounted for rotation with said first gear and movable into engagement with said arms of said escapement wheel during movement of said first gear into and out of meshing engagement with said second gear to hold said escapement wheel and second gear against rotation.

9. A machine tool as set forth in claim 8 wherein said means mounted for rotation with said first gear includes a carrier member and a plurality of rollers mounted on said carrier member, said rollers being movable into engagement with said arms of said escapement wheel by rotation of said first gear to hold said second gear against rotation relative to said base.

10. A machine tool comprising a base, means connected with said base for holding a workpiece, rotatable turret means for holding a plurality of tools for performing work operations on the workpiece, releasable coupling means for holding said turret means against rotation relative to said base, said coupling means being operable between an engaged condition in which said coupling means is effective to hold said turret means against rotation relative to said base and a disengaged condition in which said coupling means is ineffective to hold said turret means against rotation relative to said base, indexing means operable to effect rotation of said turret means relative to said base during an intermediate position of an indexing cycle to thereby change the positions of the tools relative to the workpiece, said indexing means including actuator means for operating said coupling means from the engaged condition to the disengaged condition during an initial portion of the indexing cycle to release said turret means for rotation during the intermediate portion of the indexing cycle and for operating said coupling means for the disengaged condition to the engaged condition during a final portion of the indexing cycle to hold said turret means in a position to which it is rotated during the intermediate portion of the indexing cycle, first and second rotatable gears, said first gear including a drive segment and a positioning segment, said second gear including a drive segment for meshing with said drive segment of said first gear during the intermediate portion of the indexing cycle to effect rotation of said gears and said turret means relative to said base and indexing segments for cooperating with said positioning segment on said first gear during the initial and final portions of the indexing cycle, retaining means connected with one of said gears and escapement means connected with the other of said gears for cooperating with said retaining means to hold said second gear and said turret means against rotation relative to said base as said coupling means is operated between the engaged and disengaged conditions during the initial and final portions of the indexing cycle, said retaining means and said escapement means being movable between a holding condition in which said second gear and said turret means are held against rotation relative to said base and a release condition in which said second gear and said turret means are rotatable relative to said base, and drive means for rotating said first gear relative to said second gear with said positioning segment on said first gear in a cooperating relationship with one of said indexing segments on said second gear to move said drive segment on said first gear toward a position of meshing engagement with said drive segment on said second gear and for effecting operation of said actuator means to operate said coupling means to the disengaged condition with said retaining means and said escapement means in the holding condition to thereby hold said second gear and turret means against rotation as said coupling means is disengaged during the initial portion of the indexing cycle, said drive means being operable during the intermediate portion of the indexing cycle to move said retaining means and said escapement means into the release condition and to continue rotation of said first gear with said drive segments in a meshing relationship to effect rotation of said second gear and said turret means, said drive means being operable during the final portion of the indexing cycle to move said positioning segment on said first gear into cooperating relationship with one of said indexing segments on said second gear, to move said retaining means and said escapement means into the holding condition, and to effect operation of said actuator means to operate said coupling means to the engaged condition while said retaining means and said escapement means are in the holding condition to thereby hold said turret means in the position to which it was rotated during the intermediate portion of the indexing cycle.

11. A machine tool as set forth in claim 10 wherein said escapement means includes an escapement wheel mounted for rotation with said second gear about a common axis, said retaining means including a retaining assembly mounted for rotation with said first gear about a common axis, said retaining assembly including a plurality of rollers which are moved into engagement with said escapement wheel during the initial portion of said indexing cycle.

* * * * *